(12) United States Patent
Simpson et al.

(10) Patent No.: US 11,018,524 B2
(45) Date of Patent: May 25, 2021

(54) INDUCTION DRIVEN LIGHTING

(71) Applicants: David Simpson, Chatham, NJ (US);
Linda Kennyhertz, Chatham, NJ (US)

(72) Inventors: David Simpson, Chatham, NJ (US);
Linda Kennyhertz, Chatham, NJ (US)

( * ) Notice: Subject to any disclaimer, the term of this patent is extended or adjusted under 35 U.S.C. 154(b) by 0 days.

(21) Appl. No.: 16/590,970

(22) Filed: Oct. 2, 2019

(65) Prior Publication Data
US 2020/0036228 A1 Jan. 30, 2020

Related U.S. Application Data

(63) Continuation of application No. PCT/US2019/017568, filed on Feb. 12, 2019.

(60) Provisional application No. 62/638,156, filed on Mar. 4, 2018, provisional application No. 62/716,017, filed on Aug. 8, 2018.

(51) Int. Cl.
H02J 50/10 (2016.01)
H02J 7/02 (2016.01)

(52) U.S. Cl.
CPC .............. *H02J 50/10* (2016.02); *H02J 7/025* (2013.01)

(58) Field of Classification Search
CPC .................................. H02J 7/025; H02J 50/10
USPC ......................................................... 307/104
See application file for complete search history.

(56) References Cited

U.S. PATENT DOCUMENTS

| | | | |
|---|---|---|---|
| 9,423,114 B1 | 8/2016 | Malina et al. | |
| 10,284,765 B1* | 5/2019 | Bunker | H04N 5/23241 |
| 2005/0093718 A1 | 5/2005 | Martin | |
| 2007/0159842 A1 | 7/2007 | Cole | |
| 2007/0191075 A1 | 8/2007 | Greene et al. | |
| 2008/0185918 A1* | 8/2008 | Metz | H01F 38/14 307/104 |
| 2009/0127937 A1* | 5/2009 | Widmer | H02J 50/005 307/149 |
| 2009/0243397 A1* | 10/2009 | Cook | H02J 50/12 307/104 |
| 2010/0006462 A1 | 1/2010 | McGuire et al. | |
| 2010/0290215 A1 | 11/2010 | Metcalf et al. | |

(Continued)

FOREIGN PATENT DOCUMENTS

| | | |
|---|---|---|
| CN | 104000462 A | 8/2014 |
| DE | 202014100822 U1 | 5/2014 |

(Continued)

OTHER PUBLICATIONS

The International Search Report and the Written Opinion of the International Searching Authority dated May 17, 2019 for PCT Application No. PCT/US2019/017568.

*Primary Examiner* — William Hernandez
(74) *Attorney, Agent, or Firm* — Brian M. Dingman; Dingman IP Law, PC

(57) ABSTRACT

An inductive power system including an inductive power transmitter coupled to a non-conductive medium, and a power cord that electrically couples the transmitter to an AC power source. The inductive power transmitter is configured to emit an electromagnetic field based on the received AC power. There is an inductive power receiver coupled to the non-conductive medium and separated from the transmitter, wherein the receiver is configured to receive the electromagnetic field after it has passed through the non-conductive medium and in response develop power. A power cord electrically couples the developed power to a power sink.

20 Claims, 10 Drawing Sheets

(56) References Cited

U.S. PATENT DOCUMENTS

| | | |
|---|---|---|
| 2011/0304220 A1 | 12/2011 | Whitehead |
| 2012/0112543 A1 | 5/2012 | van Wageningen et al. |
| 2013/0093259 A1 | 4/2013 | Hente et al. |
| 2014/0000771 A1 | 1/2014 | Sherman et al. |
| 2014/0069605 A1 | 3/2014 | Sullivan et al. |
| 2014/0091638 A1 | 4/2014 | Azancot et al. |
| 2014/0191587 A1 | 7/2014 | Van Goor et al. |
| 2014/0239710 A1 | 8/2014 | Salter et al. |
| 2015/0123487 A1* | 5/2015 | Niizuma .............. B25J 19/0045 307/104 |
| 2016/0064992 A1 | 3/2016 | Herbst et al. |
| 2016/0182826 A1 | 6/2016 | Blum et al. |
| 2016/0294227 A1 | 10/2016 | Podkamien et al. |
| 2017/0331329 A1 | 11/2017 | Kim et al. |

FOREIGN PATENT DOCUMENTS

| | | |
|---|---|---|
| ES | 2392245 T3 | 12/2012 |
| KR | 1020130087489 A | 8/2013 |
| WO | 2010132578 A1 | 11/2010 |
| WO | 20130244388 A1 | 2/2013 |

\* cited by examiner

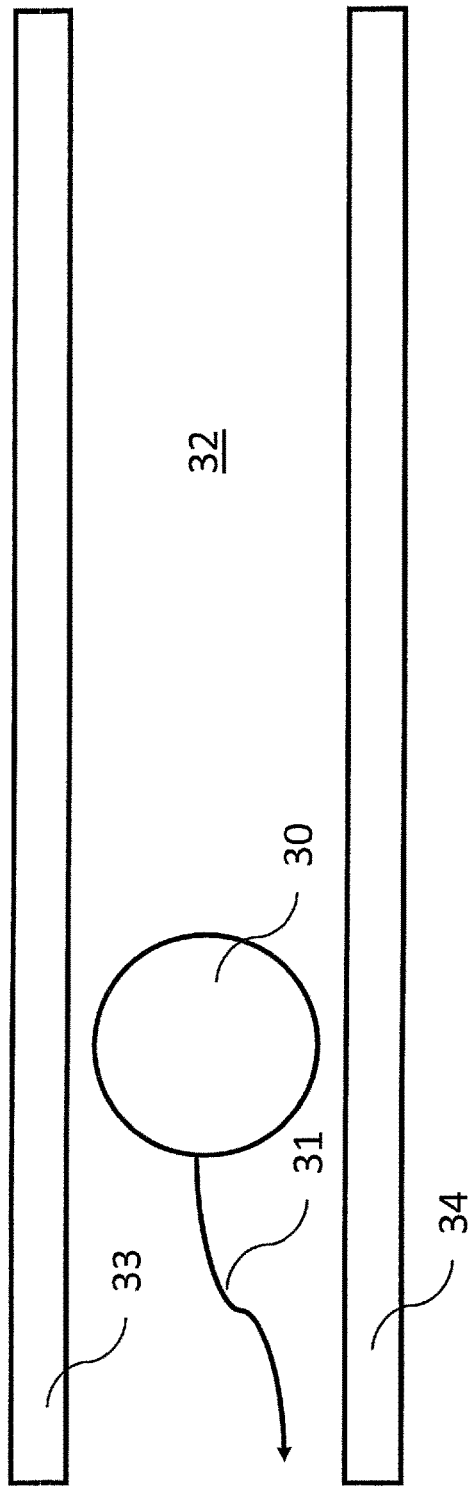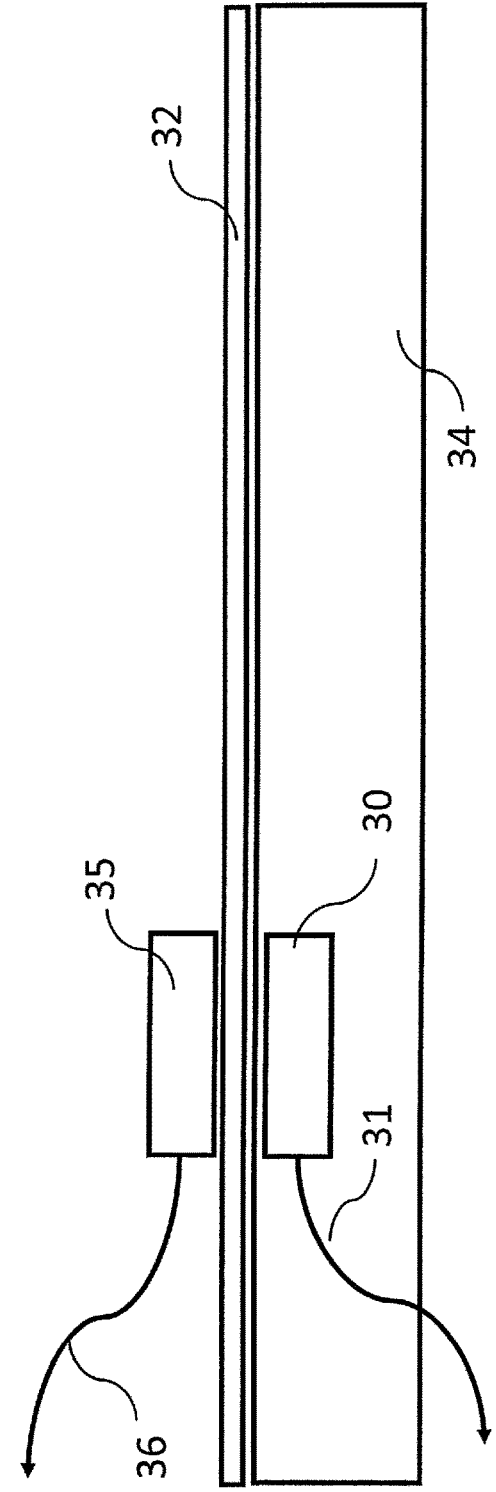

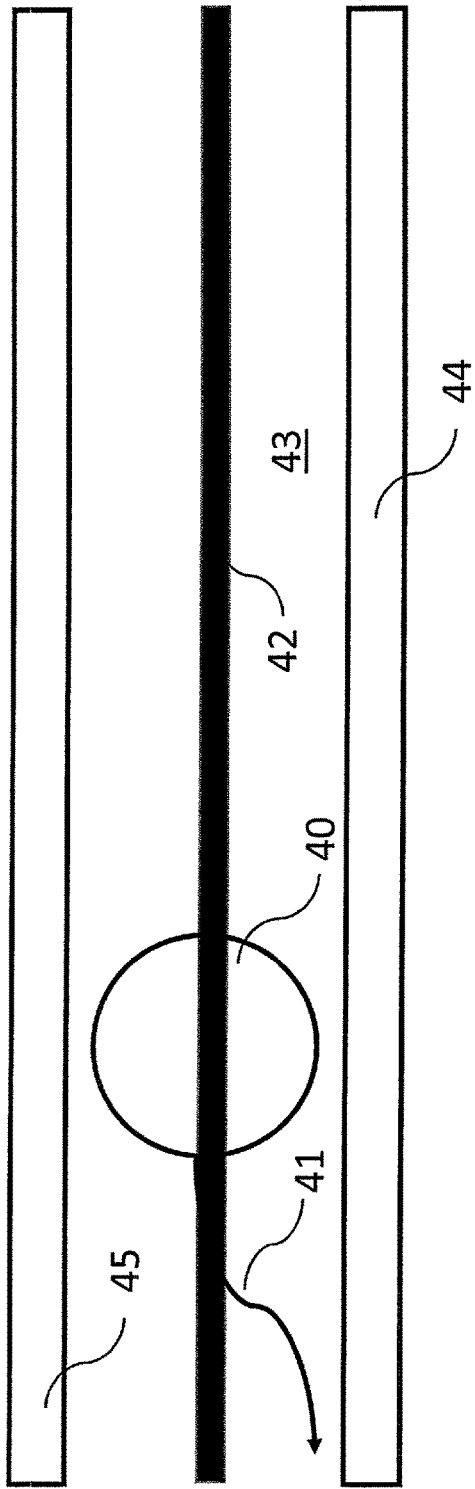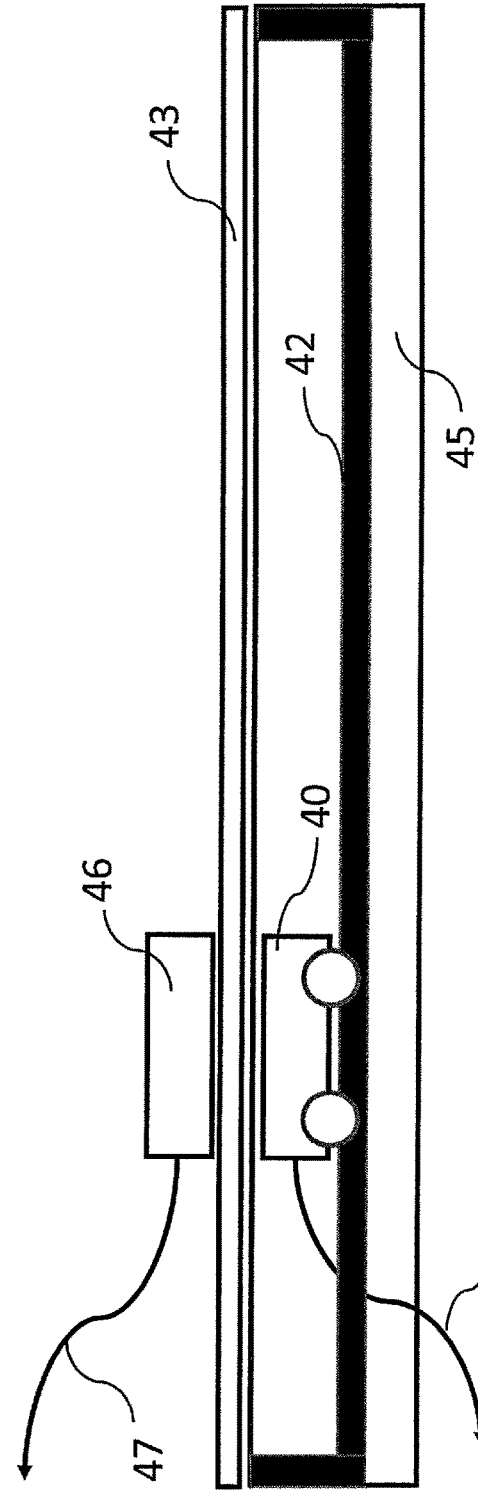
Fig. 4A
Fig. 4B

INDUCTION DRIVEN LIGHTING

CROSS-REFERENCE TO RELATED APPLICATIONS

This application is a continuation of and claims the priority of PCT/US19/17568, filed on Feb. 12, 2019, which itself claimed priority of Provisional Application 62/638,156, filed on Mar. 4, 2018 and Provisional Application 62/716,017, filed on Aug. 8, 2018. The entire disclosure of these three applications are incorporated herein by reference.

BACKGROUND

This application relates to lighting powered through induction.

During the Advent and Christmas season, it's common to see wreaths hung both inside and on the outside of buildings. In the latter case, wreaths are often hung to adorn doors, windows and other architectural elements. Modern wreaths may be made of either plant material (quite often from "evergreens") or of artificial material meant to resemble plant material. In addition, wreaths may be ornamented with decorative elements such as pine cones, holly berries, ribbons and so on. Ornamentation may also include an array of miniature electric lights in a manner similar to that of the ornamentation of a Christmas tree.

This innovation in part addresses issues associated with Lighted Window Wreaths and other outdoor ornamentation; delivering power reliably to the miniature electric lights.

Currently there are three methods of powering the miniature electric lights of outdoor ornamentation such as wreaths:
1. The lights can be powered by AC current. This requires that AC power cords be wired from an outdoor electrical outlet to each Lighted Window Wreath. These wires may be bulky, unsightly and introduce the potential danger of electrical shock.
2. The lights can be powered by a self-contained DC battery pack. Depending on how long the lights are illuminated and the capacity of the batteries being used, this approach requires that the batteries be replaced one or more times during the Holiday Season.
3. The lights can be powered by an array of photovoltaic cells ("Solar Panel") matched with rechargeable batteries wired to the lights. This approach requires sufficient sunlight to charge the batteries to the capacity necessary for each use cycle; a requirement that may render this method undesirable in geographic areas where sufficient sunlight cannot be assured. Also, the placement of the Solar Panel may be inconvenient or distract from the desired esthetic effect.

SUMMARY

The innovations embodied herein address the limitations of the current methods of powering electric lights in a number of applications in structures intended for living and working as well as in certain vehicles.

The innovations taught herein can also be applied to other power sinks, form-factors and embodiments beyond powering electric lights and include but are not limited to powering sound-generating devices, mechanical devices and security devices.

In general, the Induction Driven Lighting Innovations disclosed herein use Wireless Power Transfer (WPT) technology to provide energy through a non-metallic (non-conductive) medium—such as wood, plastic or glass—from a source separated and/or hidden from view to the instrument that receives the power and produces the lighting. As is known in the technical field, Wireless Power Transfer (WPT), wireless power transmission, wireless energy transmission, or electromagnetic power transfer is the transmission of electrical energy without wires. Wireless power transmission technologies use time-varying electric, magnetic, or electromagnetic fields. Wireless transmission is useful to power electrical devices where interconnecting wires are inconvenient, hazardous, or are not possible.

In one aspect an inductive power system includes an inductive power transmitter coupled to a non-conductive medium, a power cord that electrically couples the transmitter to an AC power source, wherein the inductive power transmitter is configured to emit an electromagnetic field based on the received AC power, an inductive power receiver coupled to the non-conductive medium and separated from the transmitter, wherein the receiver is configured to receive the electromagnetic field after it has passed through the non-conductive medium and in response develop power, and a power cord that electrically couples the developed power to a power sink.

The power sink may comprise a plurality of lights, where the lights are carried by a wreath. The power sink may comprise at least one of a lamp, a sign, an electric candle, a floor lamp, a table lamp, and electric components of a medical laboratory specimen drop/lock box. The inductive power system may further comprise a system to move the transmitter. The system to move the transmitter may be located between joists under a subfloor. The inductive power system may further comprise a system for locating the receiver relative to the transmitter. The system for locating the receiver relative to the transmitter may comprise a magnet in the transmitter and a magnet in the receiver.

The inductive power system may further comprise a power lock-out switch that is part of the transmitter, wherein the switch is configured to energize the transmitter when the switch is in contact or nearly in contact with the non-conductive medium, and de-energize the transmitter when the switch is not in contact or near contact with the non-conductive medium. The inductive power system may further comprise proximity sensing circuitry incorporated into the transmitter and configured to energize the transmitter when the transmitter is in the proximity of the receiver and de-energize the transmitter when the transmitter is not in the proximity of the receiver. The non-conductive medium may comprise a window pane. The window pane may comprise opposed first and second surfaces, and wherein the transmitter is coupled to the first surface of the window pane and the receiver is coupled to the second surface of the window pane. The power sink may comprise a dual-mode light bulb.

The transmitter may be located below a sub-floor in a structure. The power sink may comprise at least one of a holiday tree, a floor lamp, or a table lamp. The receiver may be built into furniture or a structure of a home or building. The transmitter and receiver may be coupled to the non-conductive medium with suction cups, and the system may further comprise a first enclosure for the transmitter and a second enclosure for the receiver.

BRIEF DESCRIPTION OF THE DRAWINGS

FIGS. 3A and 3B are bottom and side views, respectively, of a floor induction power system.

FIGS. 4A and 4B are bottom and side views, respectively, of a movable floor induction power system.

DETAILED DESCRIPTION

An inductive power system includes an inductive power transmitter coupled to a non-conductive medium, and a power cord that electrically couples the transmitter to an AC power source. The inductive power transmitter is configured to emit an electromagnetic field based on the received AC power. There is an inductive power receiver coupled to the non-conductive medium and separated from the transmitter. The receiver is configured to receive the electromagnetic field after it has passed through the non-conductive medium and in response develop power. A power cord electrically couples the developed power to a power sink.

Figure 1A:
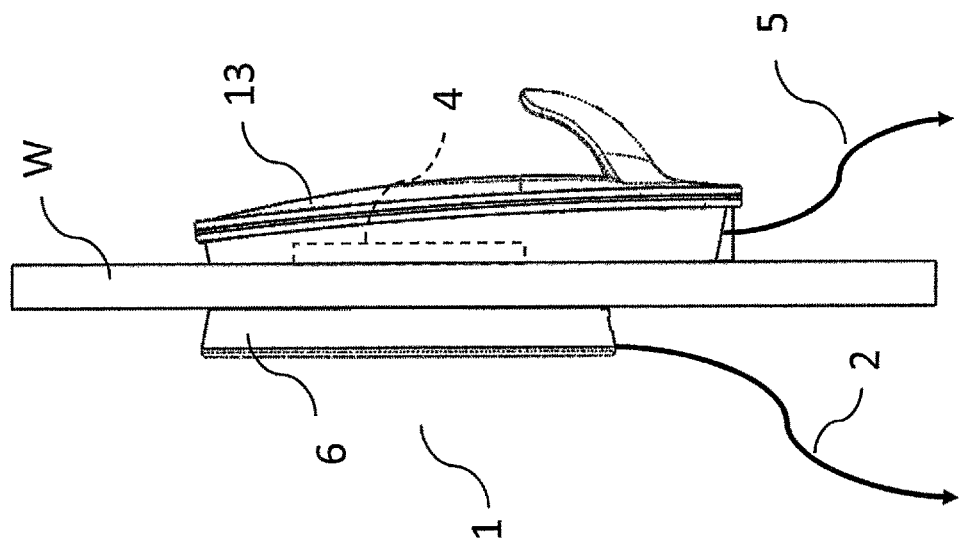
FIG. 1A is a partial side view of an inductive power system.
Figure 1B:
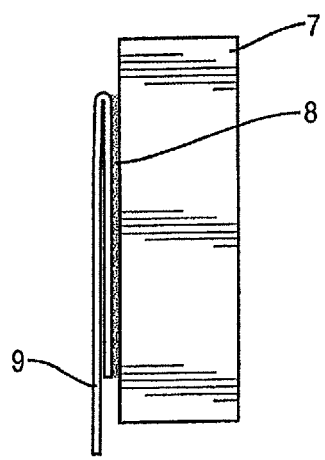
FIG. 1B illustrates one manner of coupling a receiver or transmitter to a surface.

FIG. 1 shows inductive power system 1 with receiver 4 embedded in hook 3 that is configured to be coupled to window pane W. Electrical cord 5 runs from receiver 4 to a power sink (not shown). Transmitter 6 is coupled to the other side of the window pane. Electrical cord 2 supplies power to transmitter 6 from a power source such as a wall outlet (not shown).

One or both of the transmitter and receiver are coupled to (e.g., fixed to) a non-conductive medium such as a window pane or a piece of furniture. Coupling can be accomplished in a desired manner, including but not limited to those described herein. One manner uses an adhesive strip 8, FIG. 1B, that is carried by transmitter or receiver 7. Peel-away protective cover 9 can be included. To facilitate proper location of the device before use of the adhesive strip (as explained below), cover 9 can be doubled back on itself as shown. When the device is properly positioned, the free end of cover 9 can be pulled down, to peel the cover off of the adhesive so that the device can be adhered to a surface.

Figure 1C:
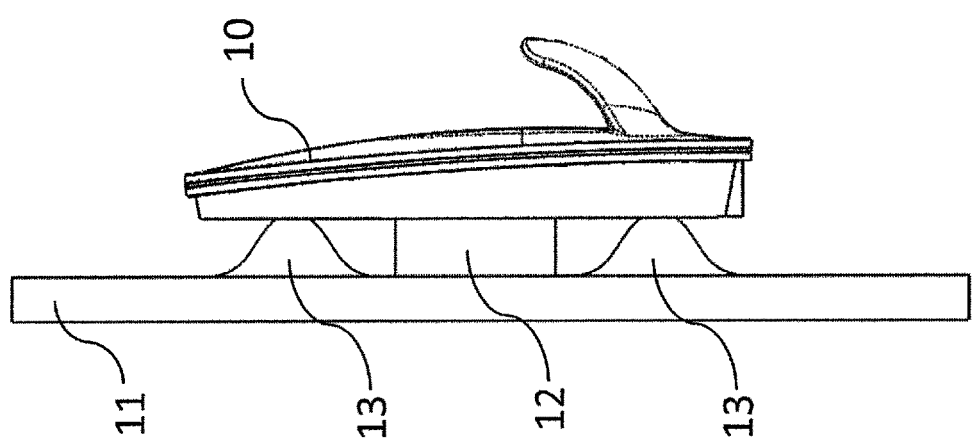
FIG. 1C illustrates one manner of coupling a receiver or transmitter to a surface.

Another coupling option is suction cup 13, FIG. 1C, that is carried by transmitter or receiver structure 10. Suction cup 13 is stuck to non-conductive medium (e.g., glass) 11. Since a suction cup will leave the transmitter or receiver spaced from medium 11, it may be best to place the transmitter or receiver in structure 12 that is carried by structure 10 and is located as close as possible to medium 11. Structure 12 may be of a non-conductive, elastic medium such as foam rubber, a plastic spring or other elastic conveyance such that the transmitter or receiver in structure 12 is always pressed as close as possible to medium 11.

Figure 2:
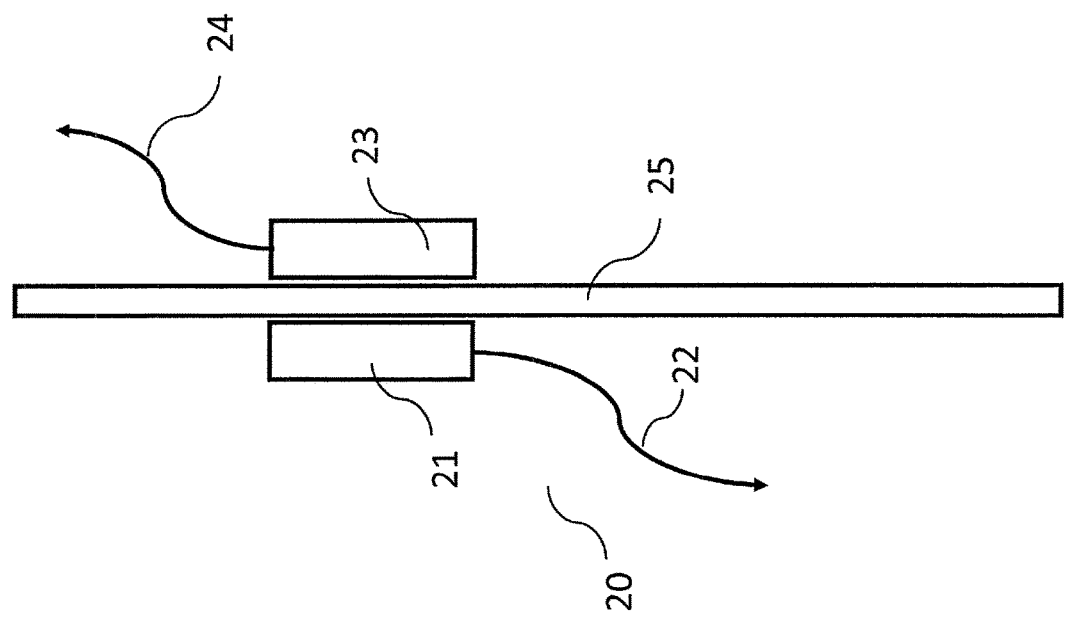
FIG. 2 is a partial side view of an inductive power system mounted to a window.

FIG. 2 illustrates wireless power transfer through glass. The induction power transmitter 21 is functionally coupled to an A/C power source via conductor 22 and is mounted on the inside of a window 25. The induction power receiver 23 is mounted to the exterior of the glass directly opposite the transmitter. The output power of the receiver is provided to the device(s) to be powered (i.e., a power sink), including but not limited to lights, via conductor 24.

EXAMPLES OF THE INDUCTION DRIVEN LIGHTING INNOVATIONS

A Lighted Window Wreath (an example of a power sink) uses Wireless Power Transfer (WPT) technology to provide energy from the interior side of a window to a Light Strand of Light Emitting Diodes ("LEDs") ornamenting a wreath hung on the exterior side of a window.

A Lighted Window Wreath may be comprised of the following components:

A. A Wreath made of either plant material or of artificial material meant to resemble plant material.

B. An AC/DC Power Adapter (such as 12V DC 1000 mA (1 A) regulated switching power adapter).

C. An Inductive Power Transmitter outfitted with a water-resistant Electrical Power Adapter (such as Female DC Power Adapter—2.1 mm jack to screw terminal block).

D. An Inductive Power Receiver outfitted with a water-resistant Electrical Power Adapter (such as Male DC Power Adapter—2.1 mm plug to screw terminal block).

E. A Light Strand comprised of water-resistant wire strung with a multiplicity of water-resistant DC powered Light Emitting Diode ("LED") lights sufficient to adorn the Wreath and outfitted with a water-resistant electrical Power Adapter (such as Female DC Power adapter—2.1 mm jack to screw terminal block).

F. An Indoor Enclosure that contains the Inductive Power Transmitter and the Female DC Power Adapter (the "Transmitter Assembly").

G. An Outdoor Enclosure that contains the Inductive Power Receiver and the Male DC Power Adapter (the "Receiver Assembly") including a Hook Device sufficient to support the weight of the Wreath and the associated Outdoor Gear.

H. Temporary Adhesive sufficient to secure the Receiver Assembly to the Window Glass on the outside of the building as well as to secure the Transmitter Assembly to the Window Glass on the inside of the building.

Operation:

1. The AC/DC Power Adapter (which is manufactured with a Male DC Power Plug) is connected to the Inductive Power Transmitter with Female DC Power Adapter ("Jack") on the Transmitter Assembly to form the Window Wreath Power Assembly.

2. The Light Strand with Female DC Power Adapter ("Jack") is connected to the Inductive Power Receiver with Male DC Power Adapter ("Plug") on the Receiver Assembly to form the Window Wreath Lighting Assembly.

3. In the case of an Outdoor Lighted Window Wreath, the Window Wreath Lighting Assembly is used to adorn the Wreath, to support the Wreath for display and to receive power from the Window Wreath Power Assembly.

4. The Window Wreath Lighting Assembly is secured to the outside of the window using the Temporary Adhesive.

5. After securing the Window Wreath Lighting Assembly, the Window Wreath Power Assembly is secured to the inside of the window using the Temporary Adhesive.
6. In this configuration:
   a. AC power is converted to DC power by the AC/DC Power Adapter and powers the Inductive Power Transmitter on the inside of the building
   b. Energy from the Inductive Power Transmitter is transmitted through the window glass and captured by the Inductive Power Receiver on the outside of the building which in turn powers the Light Strand of Light Emitting Diodes ("LEDs")

Note that the transmitted power can be DC or AC. The Transmitter Assembly should be aligned along the same "X-Axis" and "Y-Axis" as the Receiver Assembly in order to assure the optimal transmittal of power from the Inductive Power Transmitter to the Inductive Power Receiver. This can be accomplished by first mounting the receiver, wreath and light strand outside and then placing the transmitter assembly inside the window while observing the brightness of the Light Strand and securing the Transmitter Assembly to the inside of the window using the Temporary Adhesive when the Light Strand is observed to be the brightest—meaning that the transmitter and receiver are properly aligned.

Additional Notes:
1. The AC/DC Power Adapter can be a 12V DC 1000 mA (1 A) regulated switching power adapter with a 5.5 mm/2.1 mm barrel jack, positive tip designed to work using 100V-240V AC wall power.
2. The Inductive Power Transmitter can be designed to be powered with 9V DC.
3. The Inductive Power Receiver can provide a 5V DC output when the Inductive Power Transmitter is powered with 9V to 12 VDC.
4. The spacing between and the alignment of the coils that are an integral part of both the Inductive Power Transmitter and the Inductive Power Receiver is significant to the performance of the Lighted Window Wreath. For any particular pair of transmit/receive coils, the closer the coils are the more power that can be drawn. Also, any non-conductive material (such as glass or wood) can be located between the coils. Power transmission is most efficient if the coils are aligned such that they are coaxial.

Additional Aspects of the Induction-Driven Lighted Outdoor Ornamentation:

Auto-Alignment via Magnet—X-y alignment of the transmitter and receiver can be achieved by embedding magnets (e.g., small, powerful magnets such as rare-earth magnets) in both the Inductive Power Transmitter Assembly and the Inductive Power Receiver Assembly arranged and polarized in such a way as to "automatically" attract the "movable component" (the Transmitter) to the "stationary component" (the Receiver) thus aligning and securing both components by the nature of these Magnets.

I. Master-Slave via Bluetooth—When multiple Lighted Window Wreaths are displayed in close proximity to one another, it may be useful to centrally manage certain functions of all of the Wreaths, such as turning on and off at the same time, blinking in unison or in some pre-determined pattern, fading on and off together or in coordinated succession, evoking the sense of a "wave" of light moving from one Wreath to the next, and so on.

To achieve this coordination, all the Wreaths can be connected to one another via on-board Bluetooth circuitry. One unit among the many in proximity will be designated the "Master" and responsible for sending commands to the various "Slaves" nearby.

II. Home Automation via Wi-Fi—In order to control multiple Lighted Window Wreaths that are displayed within a building but not in close proximity to one another, it may be useful to employ on-board Wi-Fi circuitry that would allow the Wreaths to be controlled by a Home Automation application.

III. Power On/Off Safety Micro Contact Switch—As much as the Lighted Window Wreath Inductive Power Transmitter is held in place on the inside of the window by temporary adhesive strips, it's conceivable that these strips may become ineffective and allow the Transmitter to fall away from the window.

To minimize the possibility that the energized Transmitter comes in contact with any object inside the building, a power "lock-out" switch may be incorporated into the Transmitter's circuitry. This switch would energize the Transmitter when in contact—or nearly in contact—with the glass and remove power from the Transmitter when not in contact with the glass.

IV. Power On/Off Safety Proximity Sensing Circuitry—As referenced, above, in the description of the Power On/Off Safety Micro Contact Switch, it's conceivable that the temporary adhesive strips or the suction cups securing the Transmitter in place may become ineffective and allow the Transmitter to fall away from the window. Another approach to minimize the possibility that the energized Transmitter comes in contact with any object inside the building, Proximity Sensing Circuitry may be incorporated into the Transmitter's circuitry and employed as a power "lock-out" switch. This Proximity Sensing Circuitry would energize the Transmitter when in the proximity of the Receiver and remove power from the Transmitter when not in the proximity of the Receiver.

V. Adhesive Strip with Flush Peel-Away—As noted previously, the Inductive Power Transmitter and the Inductive Power Receiver should be aligned to insure the best transfer of power through the window glass and the brightest possible illumination of the lights. The technique for doing this may involve placing the Transmitter directly on the glass opposite the Receiver and moving it along the "X-Axis" and "Y-Axis" while observing the relative brightness of the lights.

If the protective Peel-Away Paper of the Adhesive Strip were removed for this process before the alignment were attempted, the Transmitter could inadvertently become stuck to the window unintentionally in a non-optimal spot. However, if the Peel-Away Paper of the Adhesive Strip were "doubled back" on itself as in FIG. 1B, the user could find the optimal alignment of the Transmitter while in direct contact with the glass and then remove the Peel-Away Paper without jeopardizing the alignment.

VI. Trim Pot Brightness—When a single Lighted Window Wreath is mounted and fully operational, it may be desirable to adjust the brightness of the lights to accommodate the overall esthetic of the decoration at that venue. Likewise, when multiple Lighted Window Wreaths are displayed in close proximity to one another, it may be useful to adjust the brightness of the lights among multiple wreaths relative to one another so they more pleasingly "match" in brightness.

In either case, the circuitry of each Inductive Power Transmitter could have an easily accessible "Trim Pot"

to adjust the brightness of the lights on the Wreath associated with that Transmitter.

VII. Special Lighting Effects (fade, blink, time-of-day)—The circuitry of each Inductive Power Transmitter (e.g., a controller) could be programmed to have certain Special Lighting Effects such as turning on and off at a given time every day, a "blinking" mode, a "fade on and off" mode and so on.

The controls for these Special Lighting Effects should be easily accessible by the user at the Inductive Power Transmitter via a user interface (UI).

Various Form-Factors and Embodiments

I. Lighted Window Wreath—Currently there are three methods of supplying electrical power to the miniature electric lights in Lighted Window Wreaths and other outdoor ornamentation. Each of these methods is inconvenient and inadequate. This innovation addresses the limitations of the current methods of powering the electric lights in a Lighted Window Wreath without batteries or outdoor wiring. The subject Lighted Window Wreath uses Wireless Power Transfer (WPT) technology to provide energy from the interior side of a window to a Light Strand of Light Emitting Diodes ("LEDs") ornamenting a wreath hung on the exterior side of a window.

II. Lighted Window Sign—In the same way that the Lighted Window Wreaths use Wireless Power Transfer (WPT) technology to provide energy from the interior side of a window to a Light Strand of Light Emitting Diodes ("LEDs") ornamenting a wreath hung on the exterior side of a window, the Lighted Window Sign uses Wireless Power Transfer (WPT) technology to provide energy from the interior side of a window to an electric sign hung on the exterior side of a window. This innovation may be employed in the window of a building or in the window of a vehicle such as a car or a truck.

III. Window Sill Induction Powered Electric Candles—As commercially available today, Electric Candles that are used to adorn window sills may be powered by battery or by a direct connection to AC current. In the case of the former, the batteries will require replacement periodically. In the case of the latter, unsightly wires must run from the Electric Candle to a nearby AC outlet.

If the windows of the building are constructed with Induction Power Transmitter Devices hidden inside each sill, purpose-built Induction-Powered Electric Candles need only be placed in the proper spot on the window sill in order to receive sufficient power to illuminate the lamp integrated in the Candles.

IV. Floor Induction Power System—See FIGS. 3A and 3B. As will become evident in the following examples, a Floor Induction Power System is called for comprising an Induction Power Receiver Device that is designed to be "paired" with an Induction Power Transmitter Device hidden under the floor. Not only must the Transmitter and the Receiver be aligned with one another relative to the "X" and "Y" axis of the floor (whereas "X" and "Y" are the length and width) but they must also be as close to one another relative to the "Z" axis (or the thickness of the floor) as possible. For this reason, in a building constructed with wooden floor joists and wooden sub-flooring, the Induction Power Transmitter Device should ideally be situated between the floor joists. FIGS. 3A and 3B illustrate how a floor induction system could be installed with the transmitter 30 located on the bottom side of the subflooring 32, between adjacent joists 33 and 34. Receiver 35 is located on the top side of the floor and supplies power to cord 36 that leads to a power sink.

V. Floor Induction Powered Holiday Trees—As commercially available today, Natural or Artificial Holiday Trees are typically powered by a direct connection to AC current, requiring that unsightly—and potentially unsafe—wires must run from the Trees to a nearby AC outlet.

If the building is constructed with a Floor Induction Power System, the purpose-built Trees—or existing Trees retrofitted with an Induction Power Receiver—need only be placed in the proper spot on the floor in order to receive sufficient power to illuminate the Trees.

VI. Floor Induction Powered Floor Lamps—As commercially available today, Floor Lamps are typically powered by a direct connection to AC current, requiring that unsightly—and potentially unsafe—wires must run from the Lamp to a nearby AC outlet.

If the building is constructed with a Floor Induction Power System, the purpose-built Lamp—or existing Lamps retrofitted with an Induction Power Receiver—need only be placed in the proper spot on the floor in order to receive sufficient power to illuminate the Lamp.

VII. Floor Induction Powered Table Lamps—As commercially available today, Table Lamps are typically powered by a direct connection to AC current, requiring that unsightly—and potentially unsafe—wires must run from the Lamp to a nearby AC outlet.

If the building is constructed with a Floor Induction Power System, the Lamp's Induction Power Receiver Retrofit Device need only be placed in the proper spot on the floor in order to receive sufficient power to illuminate the Lamp.

Figure 8:
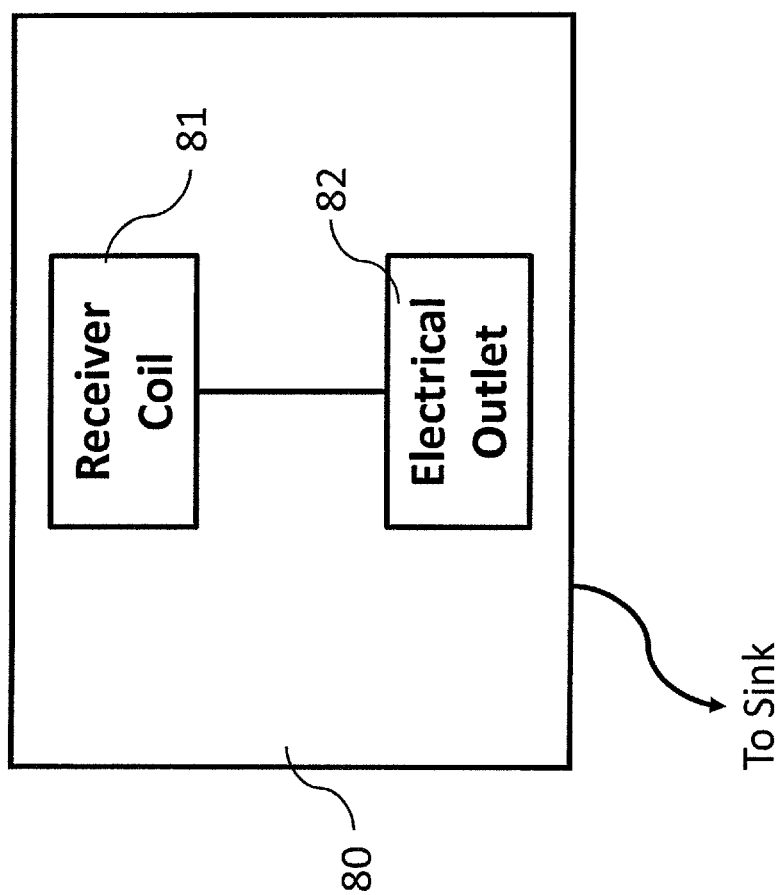
FIG. 8 is a schematic block diagram of an induction power receiver retrofit device.

VIII. Induction Power Receiver Retrofit Device—See FIG. 8. As described in the previous examples, existing commercially available Natural or Artificial Holiday Trees, Table Lamps and Floor Lamps that are typically powered by a direct connection to AC current may be powered by an Induction Power Receiver Retrofit Device 80 that is designed to be "paired" with the Induction Power Transmitter Device hidden under the floor.

If the building is constructed with a Floor Induction Power System, the Induction Power Receiver Retrofit Device 80 need only be placed in the proper spot on the floor in order to receive sufficient power via receiver coil 81 to illuminate the existing Trees or Lamps. Standard electrical outlet 82 can be included so that the power sink can be plugged into the power outlet of device 80.

Figure 7:
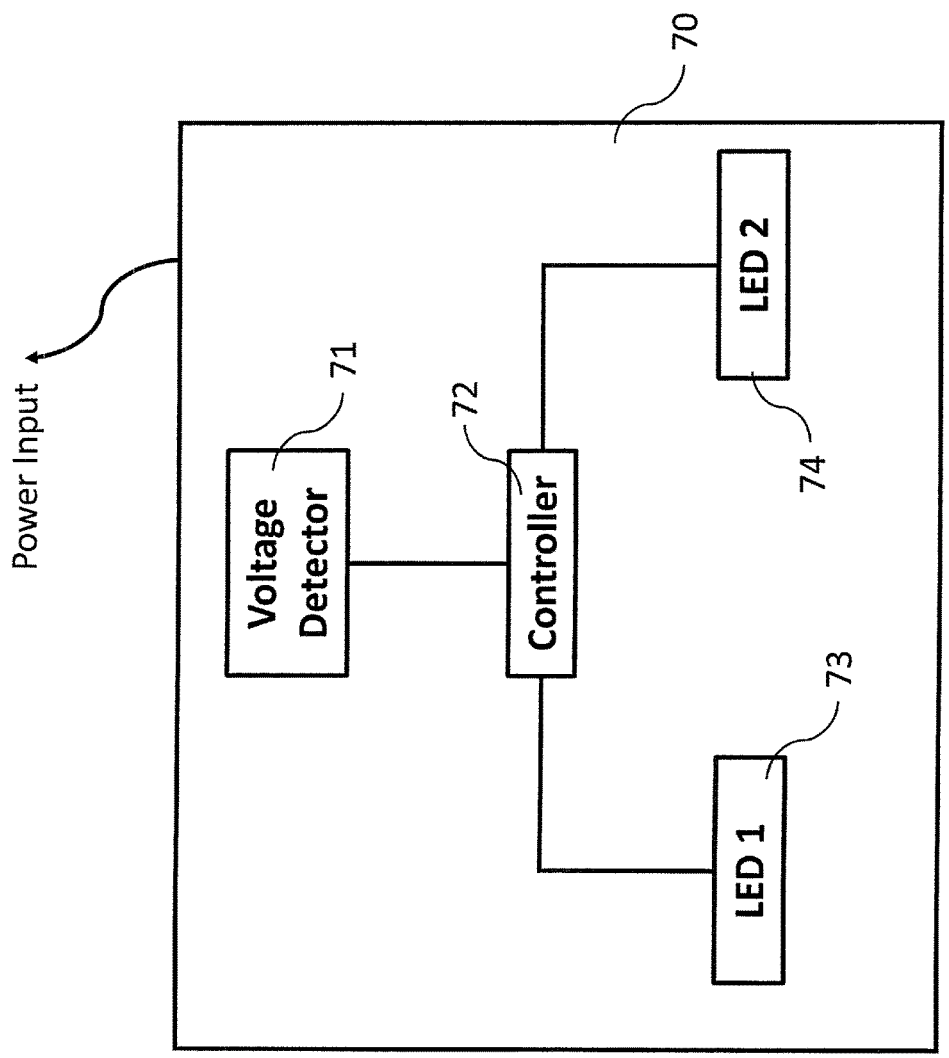
FIG. 7 is a schematic block diagram of a dual-mode light bulb for an inductive power system.

IX. Dual-Mode LED Light Bulb—See FIG. 7, which is a conceptual, non-limiting example.

The aforementioned innovations teach that commercially available Table Lamps and Floor Lamps that are typically powered by a direct connection to AC current may also be powered by an Induction Power Receiver Retrofit Device that is designed to be "paired" with the Induction Power Transmitter Device hidden under the floor. These Lamps are typically designed to use incandescent, fluorescent or LED light bulbs that require 110 VAC to operate.

In the event that it not practical for the Induction Power System described in the previous examples to deliver 110 VAC, it may be necessary to replace the light bulbs in the Lamps with a Dual-Mode Light Bulb 70 that can operate equally as well on 110 VAC as on the voltage delivered by the Induction Power System. A dual-mode light bulb may have separate LEDs that are designed to be powered at separate voltages, together with voltage detecting and switching apparatus. Or, one LED device may be enabled to operate at different voltages, in which case the voltage detecting and switching may not be needed. Likewise, one LED device may be enabled to operate at different voltages, utilizing voltage detecting, switching and transformer circuitry in order to match the voltage being received to the proper voltage needed to power the LED device. LED light bulbs 73 and 74 that are commercially available today are known for producing lumens (brightness) comparable to incandescent light bulbs while consuming considerably less power and may serve as an ideal candidate. This purpose-built Dual-Mode LED Light Bulb would employ internal circuitry (voltage detector 71 and controller 72) to detect the voltage being delivered to it and switch automatically to the appropriate mode; either that of the typical 110 VAC "house current" for one light bulb or that of the electrical current being delivered by the Induction Power Receiver Retrofit Device as part in a whole System for the other light bulb.

X. Traveling Induction Power Transmitter Track—See FIGS. 4A and 4B. As described previously, the Floor Induction Power System comprises an Induction Power Receiver Device 46 (with output power cord 47) that is designed to be "paired" with the Induction Power Transmitter Device 40 (with input power cord 41) hidden under the floor.

In the event that the Induction Power Transmitter Device is mounted in a fixed location between the floor joists, the Receiver must be placed in only one location on the floor above in order to work properly. The innovation of the Traveling Induction Power Transmitter Track teaches that a remotely-controlled, motorized track 42 enables the Transmitter 40 to move along the entire length of the gap between the floor joists 44 and 45. The ability to move is schematically depicted by a wheeled conveyance, but movement can be accomplished in any desired fashion. This arrangement allows the Receiver to be placed anywhere along the entire length of the axis along which the floor joists run, enabling much greater utility to the placement of the associated Lamps.

Figure 5:
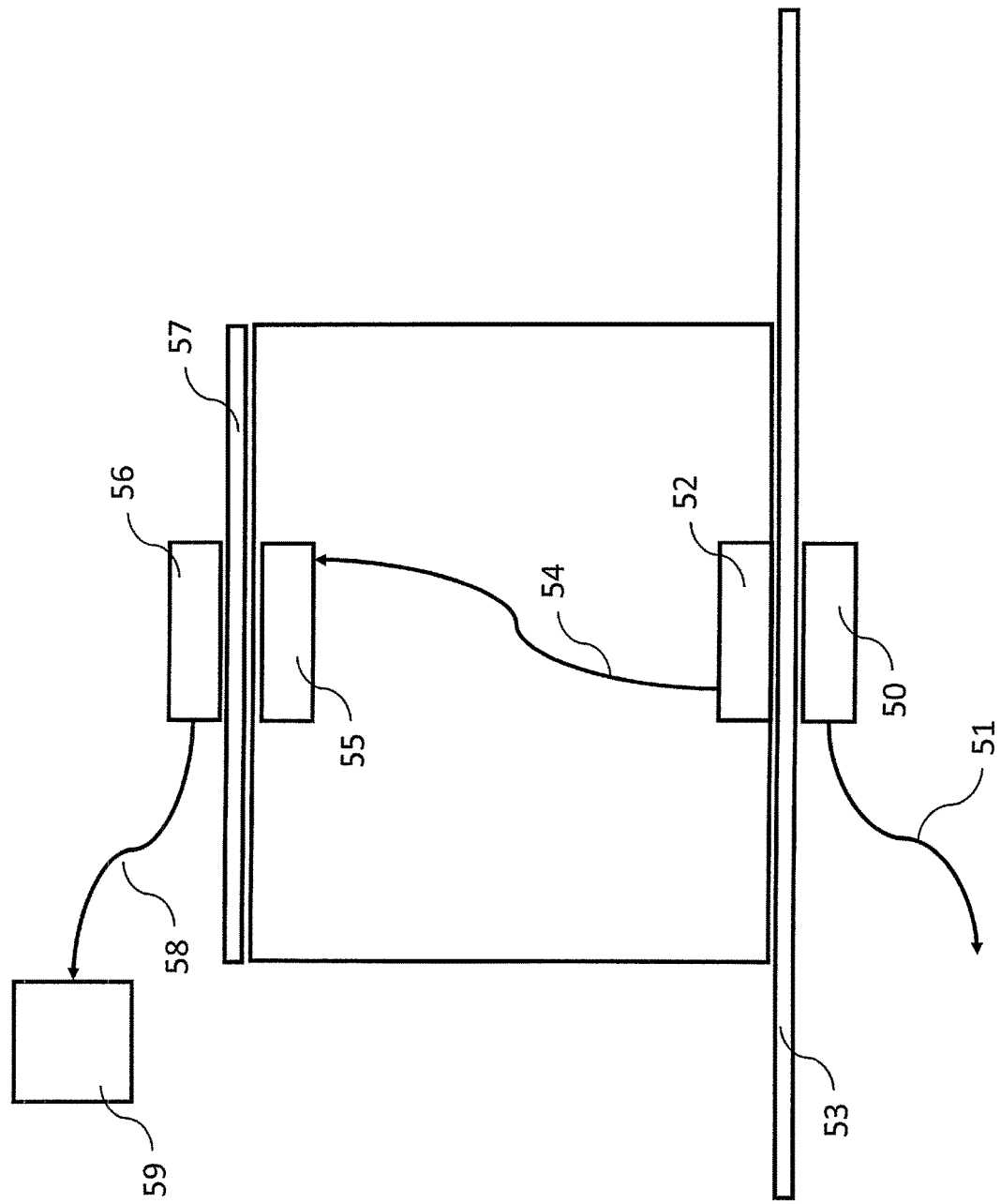
FIG. 5 is a schematic view of induction power furniture integration.

XI. Induction Power Furniture Integration—As described previously, the Induction Power System includes an Induction Power Receiver Device that is designed to be "paired" with the Induction Power Transmitter Device hidden under the floor. Various tables—end tables, night tables, coffee tables, and so on—may be created with a Induction Power Receiver Device ("secondary coil") within and flush to the floor in order to receive power from the Induction Power Transmitter Device ("primary coil") hidden under the floor. The power thus received is sent to an Induction Power Transmitter Device ("primary coil" hidden under the Table Top in order to power an Induction Powered Light (or other electronic device) atop the Table. See FIG. 5 for an example of induction power furniture integration, wherein induction power transmitter 50 supplied with power over cord 51 is located below floor 53 and receiver 52 is located just above the floor. The output of receiver 52 is provided over conductor 54 to induction power transmitter 55 that is located just below tabletop 57. Induction power receiver 56 located above the table top receives the energy and provides it to a sink 59 (e.g., lighting) over cord 58.

XII. Induction Powered Reading Lamp—The Induction Powered Reading Lamp is a portable lamp that includes a secondary coil of an inductive coupling and receives its power when positioned on the Induction Power furniture (as described, above) proximate the upper surface and above the primary coil.

As mentioned previously, the innovations taught herein can also be applied to other form-factors and embodiments beyond powering electric lights and include but are not limited to powering sound-generating devices, mechanical devices and security devices.

Additional Form-Factors and Embodiments

XIII. Window Induction Powered Temperature Controlled Medical Laboratory Specimen Drop/Lock Box—In medicine, a laboratory specimen is a biological specimen taken by sampling, that is, gathered matter of a medical patient's tissue, fluid, or other material derived from the patient used for laboratory analysis to assist differential diagnosis or staging of a disease process. Common examples include throat swabs, sputum, urine, blood, surgical drain fluids and tissue biopsies.

Typically, these laboratory specimens are left outside a doctor's office in a plain steel box for a laboratory driver to pick up from the doctor's office and deliver to the laboratory for analysis. These boxes may be floor-mounted, wall-mounted or door-hanging in design.

The importance of maintaining an acceptable temperature range for these samples while in the drop/lock box is critical to the efficacy of the laboratory analysis to be performed. Often, to maintain specimen integrity passively, these boxes will be constructed with an EPS foam lining. However, under extreme heat and cold conditions, active temperature control may be called for; cooling when the interior temperature exceeds a given threshold or heating when the interior temperature falls below a given threshold. For cooling, this may involve an electric fan. For heating, this may require a heating coil. In either case, a thermostat may be required to control either the electric fan or the heating coil (collectively, the "Electric Components"). This innovation addresses the limitations of the current methods of powering the Electric Components in a Temperature Controlled Medical Laboratory Specimen Drop/Lock Box without batteries or outdoor AC wiring.

In the same way that the Lighted Window Wreaths uses Wireless Power Transfer (WPT) technology to provide energy from the interior side of a window to a Light Strand of Light Emitting Diodes ("LEDs") ornamenting a wreath hung on the exterior side of a window, the Window Induction Powered Temperature Controlled Medical Laboratory Specimen Drop/Lock Box can be the power sink in a Wireless Power Transfer (WPT) system to provide energy from the interior side of a window to the Electric Components of a Medical Laboratory Specimen Drop/Lock Box on the exterior of the building.

Figure 6:
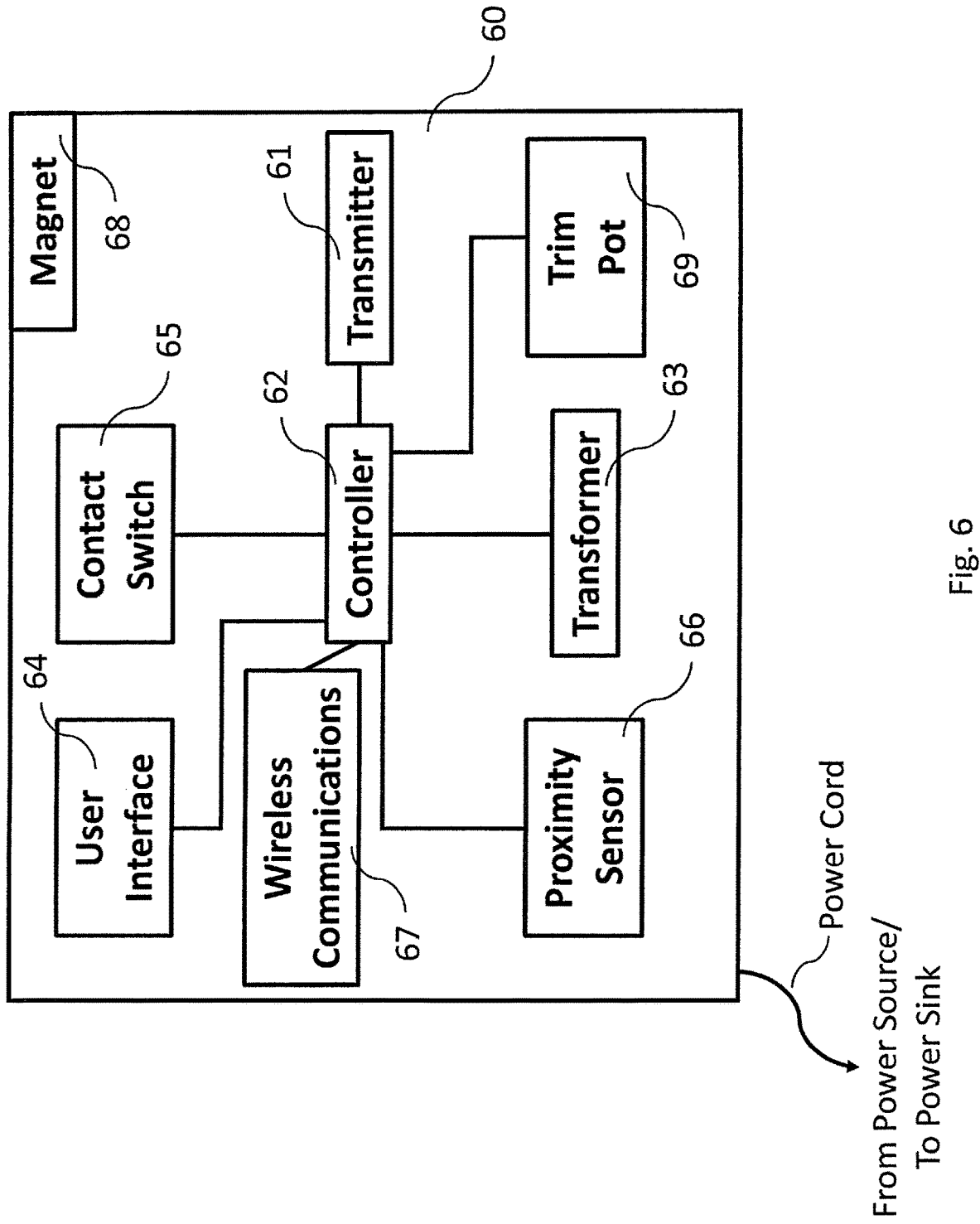
FIG. 6 is a schematic block diagram of a transmitter for an inductive power system.

FIG. 6 details inductive power transmitter 60. Note that the receiver may include the same components (with a receiver rather than a transmitter), or not. Power is supplied or provided to the power cord. Transformer 63 may be included if the power needs to be changed, either from/to AC or DC, or up/down in voltage. Trim pot 69, proximity sensor 66, wireless communications module 67, user interface 64, contact switch 65, and magnet 68 can be included as desired or needed and as described elsewhere herein. Controller 62 can control any necessary aspects of the system.

A number of implementations have been described. Nevertheless, it will be understood that additional modifications may be made without departing from the scope of the inventive concepts described herein, and, accordingly, other embodiments are within the scope of the following claims.

What is claimed is:

1. An inductive power system, comprising:
   an inductive power transmitter fixed to a first side of a non-conductive medium;
   a power cord that electrically couples the transmitter to an AC power source;
   wherein the inductive power transmitter is configured to emit an electromagnetic field based on the received AC power;
   an inductive power receiver fixed to a second, opposed side of the non-conductive medium and separated from the transmitter by the non-conductive medium, wherein the receiver is configured to receive the electromagnetic field after it has passed through the non-conductive medium and in response develop power;
   a power cord that electrically couples the developed power to a power sink; and
   proximity sensing circuitry incorporated into the transmitter and configured to energize the transmitter when the transmitter is in the proximity of the receiver and de-energize the transmitter when the transmitter is not in the proximity of the receiver.

2. The inductive power system of claim 1, wherein the power sink comprises a plurality of lights that are carried by a wreath, wherein the wreath is coupled to the second side of the non-conductive medium.

3. The inductive power system of claim 1, wherein the power sink comprises at least one of a lamp, a sign, an electric candle, a floor lamp, a table lamp, and electric components of a medical laboratory specimen drop/lock box.

4. The inductive power system of claim 1, wherein the receiver is built into furniture or a structure of a home or building.

5. The inductive power system of claim 1, wherein the transmitter and receiver are each fixed to the non-conductive medium with suction cups, and wherein the inductive power system further comprises a first enclosure for the transmitter and a second enclosure for the receiver.

6. The inductive power system of claim 1, further comprising a locating system for locating the receiver relative to the transmitter.

7. The inductive power system of claim 6, wherein the locating system comprises a first magnet embedded in the transmitter and a second magnet embedded in the receiver, wherein the first and second magnets have sides facing each other that are oppositely polarized, so that the two magnets attract as they are brought close together.

8. The inductive power system of claim 1, further comprising a power lock-out switch that is part of the transmitter, wherein the switch is configured to energize the transmitter when the switch is in contact or nearly in contact with the non-conductive medium, and de-energize the transmitter when the switch is not in contact or near contact with the non-conductive medium.

9. The inductive power system of claim 1, wherein the non-conductive medium comprises a window pane.

10. The inductive power system of claim 9, wherein the window pane comprises opposed first and second surfaces, and wherein the transmitter is fixed to the first surface of the window pane and the receiver is coupled to the second surface of the window pane.

11. The inductive power system of claim 1, wherein the power sink comprises a dual-mode light bulb that is electrically operable both by direct connection to an AC power source and the power developed by the receiver.

12. The inductive power system of claim 1, wherein the transmitter is located below a sub-floor in a structure.

13. The inductive power system of claim 12, wherein the power sink comprises at least one of a holiday tree, a floor lamp, or a table lamp.

14. An inductive power system, comprising:
   an inductive power transmitter fixed to an inside surface of an exterior window of a building;
   a power cord that electrically couples the transmitter to an AC power source in the inside of the building;
   wherein the inductive power transmitter is configured to emit an electromagnetic field based on the received AC power;
   a hook that is removably coupled to an opposed exterior side of the window directly opposite the transmitter;
   an inductive power receiver embedded in the hook, wherein the receiver is configured to receive the electromagnetic field after it has passed through the window-medium, and in response develop power;
   a lighted wreath carried by the hook and comprising a plurality of electrically-powered lights; and
   a power cord that electrically couples the developed power to the lights of the wreath.

15. The inductive power system of claim 14, further comprising a first magnet embedded in the transmitter and a second magnet embedded in the receiver, wherein the first and second magnets have sides facing each other that are oppositely polarized, so that the two magnets attract as they are brought close together, to assist in locating the receiver directly opposite the transmitter.

16. The inductive power system of claim 14, further comprising a power lock-out switch that is part of the transmitter, wherein the switch is configured to energize the transmitter when the switch is in contact or nearly in contact with the window, and de-energize the transmitter when the switch is not in contact or near contact with the window.

17. The inductive power system of claim 14, further comprising proximity sensing circuitry incorporated into the transmitter and configured to energize the transmitter when the transmitter is in the proximity of the receiver and de-energize the transmitter when the transmitter is not in the proximity of the receiver.

18. An inductive power system, comprising:
   an inductive power transmitter fixed to an inside surface of an exterior window of a building;
   a power cord that electrically couples the transmitter to an AC power source in the inside of the building;
   wherein the inductive power transmitter is configured to emit an electromagnetic field based on the received AC power;
   an inductive power receiver that is removably fixed to an opposed exterior side of the window directly opposite the transmitter, wherein the receiver is configured to receive the electromagnetic field after it has passed through the window, and in response develop power;
   a lighted wreath coupled to the exterior side of the window proximate the receiver and comprising a plurality of electrically-powered lights;
   a power cord that electrically couples the developed power to the lights of the wreath;
   a first magnet embedded in the transmitter and a second magnet embedded in the receiver, wherein the first and second magnet have sides facing each other that are oppositely polarized, so that the two magnets attract as they are brought close together, to assist in locating the receiver directly opposite the transmitter;

a power lock-out switch that is part of the transmitter, wherein the switch is configured to energize the transmitter when the switch is in contact or nearly in contact with the window, and de-energize the transmitter when the switch is not in contact or near contact with the window; and proximity sensing circuitry incorporated into the transmitter and configured to energize the transmitter when the transmitter is in the proximity of the receiver and de-energize the transmitter when the transmitter is not in the proximity of the receiver.

19. An inductive power system, comprising:

an inductive power transmitter fixed to a first side of a non-conductive medium;

a power cord that electrically couples the transmitter to an AC power source;

wherein the inductive power transmitter is configured to emit an electromagnetic field based on the received AC power;

an inductive power receiver fixed to a second, opposed side of the non-conductive medium and separated from the transmitter by the non-conductive medium, wherein the receiver is configured to receive the electromagnetic field after it has passed through the non-conductive medium and in response develop power;

a power cord that electrically couples the developed power to a power sink; and a locating system for locating the receiver relative to the transmitter and that comprises a first magnet embedded in the transmitter and a second magnet embedded in the receiver, wherein the first and second magnets have sides facing each other that are oppositely polarized, so that the two magnets attract as they are brought close together.

20. An inductive power system, comprising:

an inductive power transmitter fixed to a first side of a non-conductive medium;

a power cord that electrically couples the transmitter to an AC power source;

wherein the inductive power transmitter is configured to emit an electromagnetic field based on the received AC power;

an inductive power receiver fixed to a second, opposed side of the non-conductive medium and separated from the transmitter by the non-conductive medium, wherein the receiver is configured to receive the electromagnetic field after it has passed through the non-conductive medium and in response develop power;

a power cord that electrically couples the developed power to a power sink; and a power lock-out switch that is part of the transmitter, wherein the switch is configured to energize the transmitter when the switch is in contact or nearly in contact with the non-conductive medium, and de-energize the transmitter when the switch is not in contact or near contact with the non-conductive medium.

* * * * *